US008355248B2

(12) United States Patent
Nishi

(10) Patent No.: US 8,355,248 B2
(45) Date of Patent: Jan. 15, 2013

(54) APPARATUS AND SYSTEM FOR IMPROVED THERMAL RADIATION FOR A MOBILE COMPUTING DEVICE AND CASE

(75) Inventor: Yoshifumi Nishi, Ushiku (JP)

(73) Assignee: Intel Corporation, Santa Clara, CA (US)

( * ) Notice: Subject to any disclaimer, the term of this patent is extended or adjusted under 35 U.S.C. 154(b) by 210 days.

(21) Appl. No.: 12/970,859

(22) Filed: Dec. 16, 2010

(65) Prior Publication Data

US 2012/0155020 A1 Jun. 21, 2012

(51) Int. Cl.
*H05K 7/20* (2006.01)

(52) U.S. Cl. ......... 361/679.55; 361/679.46; 361/679.54; 361/714; 165/80.3; 165/185

(58) Field of Classification Search ............. 361/679.01, 361/679.4, 679.46, 679.47, 679.54, 679.55, 361/679.56, 688, 689, 690, 704–714; 165/67, 165/146, 80.3, 185; 206/320, 576, 701, 376; D14/440, 341–345, 346, 371, 125–129, 114; 174/50.51, 50.54, 520; 312/223.2, 223.3, 312/236

See application file for complete search history.

(56) References Cited

U.S. PATENT DOCUMENTS 5,835,344 A * 11/1998 Alexander ............... 361/679.46
5,992,155 A * 11/1999 Kobayashi et al. .............. 62/3.7
6,324,055 B1 * 11/2001 Kawabe ................... 361/679.54
6,341,062 B1 1/2002 Patel
7,158,376 B2 * 1/2007 Richardson et al. ..... 361/679.56
7,609,512 B2 * 10/2009 Richardson et al. ..... 361/679.41
7,859,841 B2 * 12/2010 Tamura et al. ................ 361/697
7,907,394 B2 * 3/2011 Richardson et al. ....... 361/679.3
7,921,997 B2 * 4/2011 Burns ........................... 206/320
2003/0095374 A1 5/2003 Richardson
2008/0310108 A1 12/2008 Eriksson et al.
2011/0120670 A1 * 5/2011 Doss et al. ................... 165/80.1

FOREIGN PATENT DOCUMENTS

EP 1494109 1/2005

OTHER PUBLICATIONS

International Search Report and Written Opinion received for PCT Patent Application No. PCT/US2011/061345, mailed on Jun. 13, 2012, 9 pgs.

* cited by examiner

*Primary Examiner* — Michail V Datskovskiy
(74) *Attorney, Agent, or Firm* — Kacvinsky Daisak PLLC

(57) ABSTRACT

Embodiments of an apparatus and system are described for a thermally radiating mobile computing device and case. An apparatus may comprise, for example, a thermally radiating case for a mobile computing device having a first portion arranged to receive the mobile computing device, a thermally conductive coupling arranged to removably couple the case to one or more internal heat generating components of the mobile computing device, and a second portion thermally coupled to the first portion and the thermally conductive coupling, the second portion comprising one or more thermally conductive materials arranged to radiate thermal energy away from the one or more heat generating components. Other embodiments are described and claimed.

20 Claims, 6 Drawing Sheets

APPARATUS AND SYSTEM FOR IMPROVED THERMAL RADIATION FOR A MOBILE COMPUTING DEVICE AND CASE

BACKGROUND

The performance and capabilities of modern computing systems have increased rapidly in recent years. Many computing system today include one or more processors, memory, wireless connectivity and other heat generating components. The number and type of capabilities and components in modern computing systems continues to increase, which often results in increased heat generation, as computing systems continue to decrease in size. Additionally, modern mobile computing systems are often used as on-the-go devices and these systems can be very costly. Users often rely on external cases to protect their valuable devices because of the increased mobility and usage scenarios associated with the devices. As a result, it is desirable to increase heat dissipation and provide protection for a mobile computing device. Consequently, there exists a substantial need for techniques to increase thermal radiation using a mobile computing device case.

DETAILED DESCRIPTION

Figure 1A:
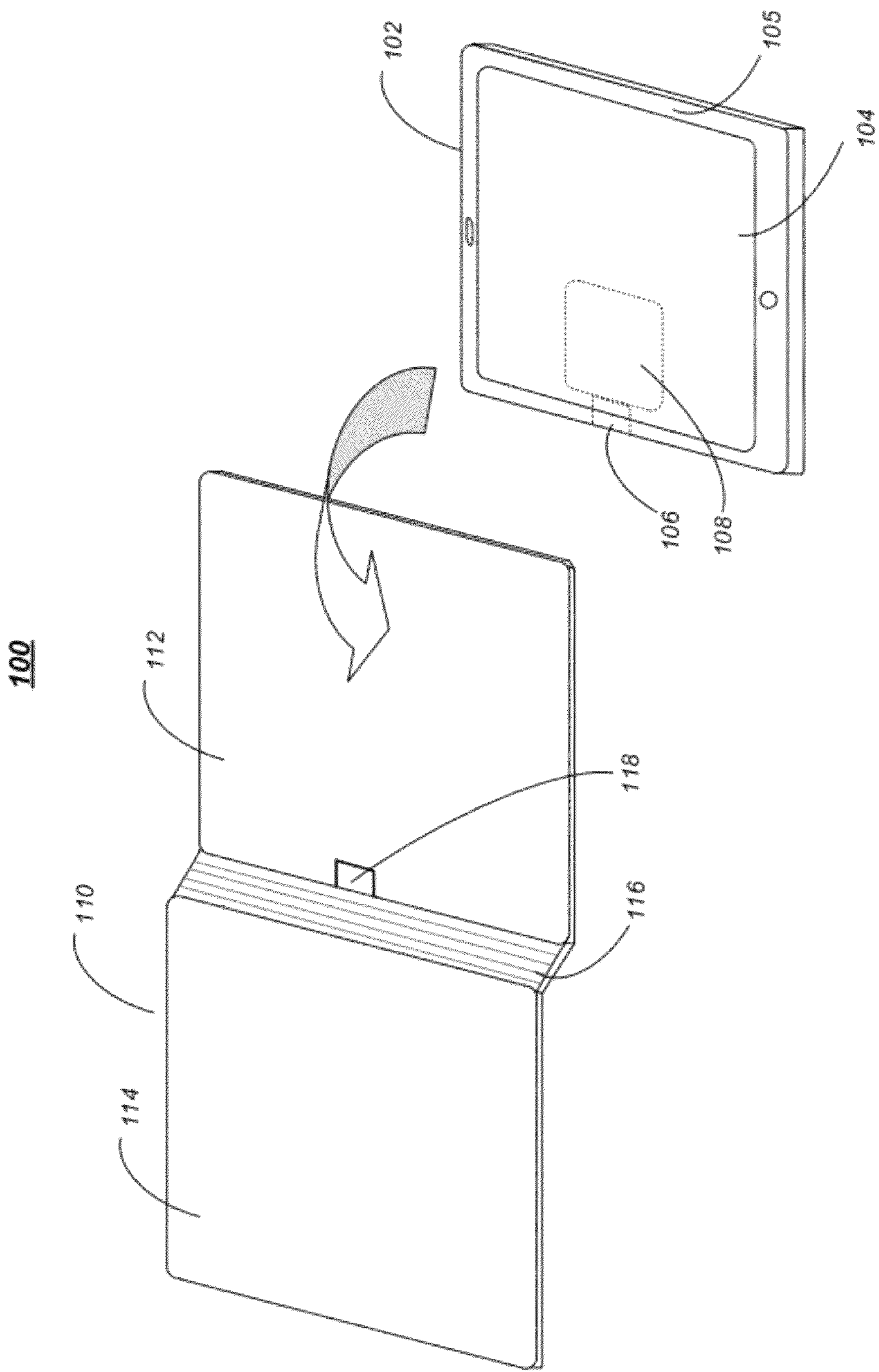
FIG. 1A illustrates one embodiment of a first system.

The embodiments are generally directed to techniques designed to increase thermal radiation for a mobile computing device. Various embodiments provide a system and apparatus that include a case for a mobile computing device comprising a first portion arranged to receive the mobile computing device, a thermally conductive coupling arranged to removably couple the case to one or more internal heat generating components of the mobile computing device and a second portion thermally coupled to the first portion and the thermally conductive coupling, the second portion comprising one or more thermally conductive materials arranged to radiate thermal energy away from the one or more heat generating components. Other embodiments are described and claimed.

With the progression over time toward the use of mobile computing devices of decreasing size and cost, the space available for components designed to remove or reduce heat generated in a mobile computing device platform is becoming increasingly limited. Modern mobile computing devices, such as tablet computers, handheld computing devices and smartphones, require effective cooling elements to prevent overheating of critical system components and also to reduce the heat transferred to the enclosure of the device that is normally in contact with the skin of a user. Presently, many mobile computing devices include heat sinks or other cooling mechanisms that comprise internal components of the device. These internal components are becoming increasingly ineffective as the space for the components decreases and the heat generated by ever increasing processing elements and components continues to increase. Additionally, active cooling components such as fans and blowers are often not practical for use in table and handheld form factors. These components require space that is generally unavailable in smaller mobile computing device platforms and they additional create undesirable noise and vibration.

With the ever-increasing cost and mobile usage of modern mobile computing devices, users often rely on external devices for protection. Cases, sleeves and other covers are often used to provide added protection, but currently these devices merely provide mechanical protection. By thermally coupling an external case or cover having thermal radiation capabilities to a mobile computing device, increased heat may be dissipated in a passive manner and additional external protection may simultaneously be achieved. Other embodiments are described and claimed.

Embodiments may include one or more elements. An element may comprise any structure arranged to perform certain operations. Each element may be implemented as hardware, software, or any combination thereof, as desired for a given set of design parameters or performance constraints. Although embodiments may be described with particular elements in certain arrangements by way of example, embodiments may include other combinations of elements in alternate arrangements.

It is worthy to note that any reference to “one embodiment” or “an embodiment” means that a particular feature, structure, or characteristic described in connection with the embodiment is included in at least one embodiment. The appearances of the phrases “in one embodiment” and “in an embodiment” in various places in the specification are not necessarily all referring to the same embodiment.

FIG. 1A illustrates a block diagram of one embodiment of a mobile computing device and case system 100. In various embodiments, the mobile computing device and case system 100 may comprise multiple nodes, element or components. A node, element or component generally may comprise any physical or logical entity in the mobile computing device and case system 100 and may be implemented as hardware, software, or any combination thereof, as desired for a given set of design parameters or performance constraints. Although FIG. 1A may show a limited number of nodes, elements and components by way of example, it can be appreciated that more or less nodes, elements or components may be employed for a given implementation.

In various embodiments, the mobile computing device and case system 100 may comprise a combination mobile computing device 102 and case 110. In some embodiments, the mobile computing device 102 may comprise a tablet computer, handheld computer, personal digital assistant (PDA), cellular telephone, combination cellular telephone/PDA, smartphone, laptop computer, ultra-laptop computer, portable computer, personal computer (PC), notebook PC, pager, messaging device, media player, digital music player, or other suitable mobile computing device. Various embodiments include reference to a tablet computer, handheld computer or smartphone. The embodiments are not limited in this context.

Mobile computing device 102 may comprise a device operative to form part of a wired communications system, a wireless communications system, or a combination of both. For example, the mobile computing device 102 may comprise one or more nodes arranged to communicate information over one or more types of wired communication links. Examples of a wired communication link may include, without limitation, a wire, cable, bus, printed circuit board (PCB), Ethernet connection, peer-to-peer (P2P) connection, backplane, switch fabric, semiconductor material, twisted-pair wire, coaxial cable, fiber optic connection, and so forth. The mobile computing device 102 also may include one or more nodes arranged to communicate information over one or more types of wireless communication links. Examples of a wireless communication link may include, without limitation, a radio channel, infrared channel, radio-frequency (RF) channel, Wireless Fidelity (WiFi) channel, a portion of the RF spectrum, and/or one or more licensed or license-free frequency bands.

The mobile computing device 102 may communicate information in accordance with one or more standards as promulgated by a standards organization. In one embodiment, for example, various devices comprising part of the communications system 100 may be arranged to operate in accordance with one or more of the IEEE 802.11 standard, the WiGig Alliance™ specifications, WirelessHD™ specifications, standards or variants, such as the WirelessHD Specification, Revision 1.0d7, Dec. 1, 2007, and its progeny as promulgated by WirelessHD, LLC (collectively referred to as the “WirelessHD Specification”), or with any other wireless standards as promulgated by other standards organizations such as the International Telecommunications Union (ITU), the International Organization for Standardization (ISO), the International Electrotechnical Commission (IEC), the Institute of Electrical and Electronics Engineers (information IEEE), the Internet Engineering Task Force (IETF), and so forth. In various embodiments, for example, the mobile computing device 102 may communicate information according to one or more IEEE 802.11 standards for wireless local area networks (WLANs) such as the information IEEE 802.11 standard (1999 Edition, Information Technology Telecommunications and Information Exchange Between Systems—Local and Metropolitan Area Networks—Specific Requirements, Part 11: WLAN Medium Access Control (MAC) and Physical (PHY) Layer Specifications), its progeny and supplements thereto (e.g., 802.11a, b, g/h, j, n, VHT SG, and variants); IEEE 802.15.3 and variants; IEEE 802.16 standards for WMAN including the IEEE 802.16 standard such as 802.16-2004, 802.16.2-2004, 802.16e-2005, 802.16f, and variants; WGA (WiGig) progeny and variants; European Computer Manufacturers Association (ECMA) TG20 progeny and variants; and other wireless networking standards. The embodiments are not limited in this context.

The mobile computing device 102 may communicate, manage, or process information in accordance with one or more protocols. A protocol may comprise a set of predefined rules or instructions for managing communication among nodes. In various embodiments, for example, the communications system 100 may employ one or more protocols such as a beam forming protocol, medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), a contention-based period (CBP) protocol, a distributed contention-based period (CBP) protocol and so forth. In various embodiments, the communications system 100 also may be arranged to operate in accordance with standards and/or protocols for media processing. The embodiments are not limited in this context.

In some embodiments, the mobile computing device 102 may comprise or be associated with a network and a plurality of other nodes. In various embodiments, the nodes may be implemented as various types of wireless or mobile computing devices. Examples of wireless devices may include, without limitation, an IEEE 802.15.3 piconet controller (PNC), a controller, an IEEE 802.11 PCP, a coordinator, a station, a subscriber station, a base station, a wireless access point (AP), a wireless client device, a wireless station (STA), a laptop computer, ultra-laptop computer, portable computer, personal computer (PC), notebook PC, tablet computer, handheld computer, personal digital assistant (PDA), cellular telephone, combination cellular telephone/PDA, smartphone, pager, messaging device, media player, digital music player, set-top box (STB), appliance, workstation, user terminal, mobile unit, consumer electronics, television, digital television, high-definition television, television receiver, high-definition television receiver, and so forth.

In some embodiments, mobile computing device 102 may comprise or include one more wireless interfaces and/or components for wireless communication such as one or more transmitters, receivers, transceivers, chipsets, amplifiers, filters, control logic, network interface cards (NICs), antennas, antenna arrays, modules and so forth. Examples of conventional antennas may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth.

In various embodiments, mobile computing device 102 may comprise or form part of a wireless network. In some embodiments, for example, the wireless network may comprise or be implemented as various types of wireless networks and associated protocols suitable for a WPAN, a Wireless Local Area Network (WLAN), a Wireless Metropolitan Area Network, a Wireless Wide Area Network (WWAN), a Broadband Wireless Access (BWA) network, a radio network, a television network, a satellite network such as a direct broadcast satellite (DBS) network, a long term evolution (LTE) network and/or any other wireless communications network arranged to operate in accordance with the described embodiments.

While the embodiments are not limited in this context, mobile computing device 102 illustrates one possible node in some embodiments. In various embodiments, mobile computing device 102 may include a display 104, enclosure 105, a thermally conductive coupling 106 and one or more heat generating components 108. While a limited number and arrangement of components are shown in FIG. 1A for purposes of illustration, it should be understood that mobile computing device 102 may include any number or arrangement of components and still fall within the described embodiments. For example, mobile computing device 102 may additionally include, in some embodiments, memory containing instructions to be executed by one or more multi-core processors for example. The embodiments, however, are not limited to the elements or the configuration shown in this figure. Additional components for mobile computing device 102 are discussed in further detail below with reference to FIG. 4.

In some embodiments, display 104 may comprise any suitable visual interface for displaying content to a user of the mobile computing device 102. In one embodiment, for example, the display 104 may be implemented by a liquid crystal display (LCD) or a touch-sensitive color LCD screen. The touch-sensitive LCD may be used with a stylus and/or a handwriting recognizer program in some embodiments. Display 104 may comprise a digital touchscreen display arranged to occupy a substantial portion of a first side of a tablet computing device in some embodiments. In various embodiments, the digital display includes a protective housing or enclosure 105 that surrounds the digital display 104 and also encloses the heat generating components 108. The enclosure

105 may comprise plastic, metal or any other material suitable for enclosing and protecting the components of mobile computing device 102.

The one or more heat generating components 108 may comprise any suitable electric device, semiconductor device or other component capable of generating heat in some embodiments. For example, the one or more heat generating components 108 may comprise a multi-core processor in various embodiments. In some embodiments, the one or more heat generating components may include or comprise one or more radio modules or combination transmitter/receiver (e.g. transceiver) devices. In various embodiments, the transceiver device may comprise a device that has both a transmitter and a receiver that are combined and share common circuitry or a single housing. For example, in some embodiments, the transceiver may be operative to enable wireless communication capabilities for mobile computing device 102. Other embodiments are described and claimed.

In various embodiments, the thermally conductive coupling 106 may comprise an opening or receptacle in enclosure 105 that is adapted to receive a mated thermally conductive coupling from an external device. For example, in some embodiments, thermally conductive coupling 106 may be operative to receive a matching or mated thermally conductive coupling 118 from case 110. In various embodiments, the thermally conductive coupling 106 may be thermally coupled to the one or more heat generating components 108 of mobile computing device 102 and may be operative to transfer heat from the one or more heat generating components 108 through the coupling 106 to an external heat dissipating device, such as case 110. The embodiments are not limited in this context.

System 100 may also include case 110 in some embodiments. Case 110 may comprise a book-style cover arranged to accommodate or receive a mobile computing device, such as mobile computing device 102 in some embodiments. In various embodiments, case 110 includes a first portion 112, a second portion 114, a hinge 116 and a thermally conductive coupling 118. While a limited style or type of case is illustrated in FIG. 1A, it should be understood that any type or style of case could be used and still fall within the described embodiments. For example, in some embodiments, case 110 may include only one portion 112, 114.

Case 110 may comprise or include one or more thermally conductive materials in some embodiments. For example, case 110 may be made of one or more thermally conductive materials or case 110 may include one or more thermally conductive materials along with one or more non-thermally conductive materials. For example, in some embodiments, case 110 may be constructed from a thermally conductive metal such as aluminum. In other embodiments, case 110 may be primarily composed of a non-thermally conductive material or a material with limited thermally conductivity properties such as leather or plastic, and may include a thermally conductive material such as aluminum or graphite within the non-thermally conductive material.

In various embodiments, each of the first portion 112, second portion 114 and hinge 116 may include the same or similar thermally conductive materials and properties. For example, in some embodiments, each of the portions 112, 114, 116 of case 110 may comprise the same composition of materials. In other embodiments, each of the portions 112, 114, 116 may include different compositions of materials and may include different thermal conductivity properties. The embodiments are not limited in this context.

Thermally conductive coupling 118 may be thermally coupled to one or more of first portion 112, second portion 114 or hinge 116 in some embodiments. In various embodiments, hinge 116 may be arranged the thermally couple the first portion 112 and the second portion 114. Hinge 116 may comprise a thermally conductive hinge arranged to couple the first portion and the second portion, wherein the thermally conductive hinge comprises a flexible conductive material. In other embodiments, the thermally conductive hinge 116 may comprise one or more of plastic, rubber or leather arranged around a flexible conductive material. The embodiments are not limited in this context.

Figure 1B:
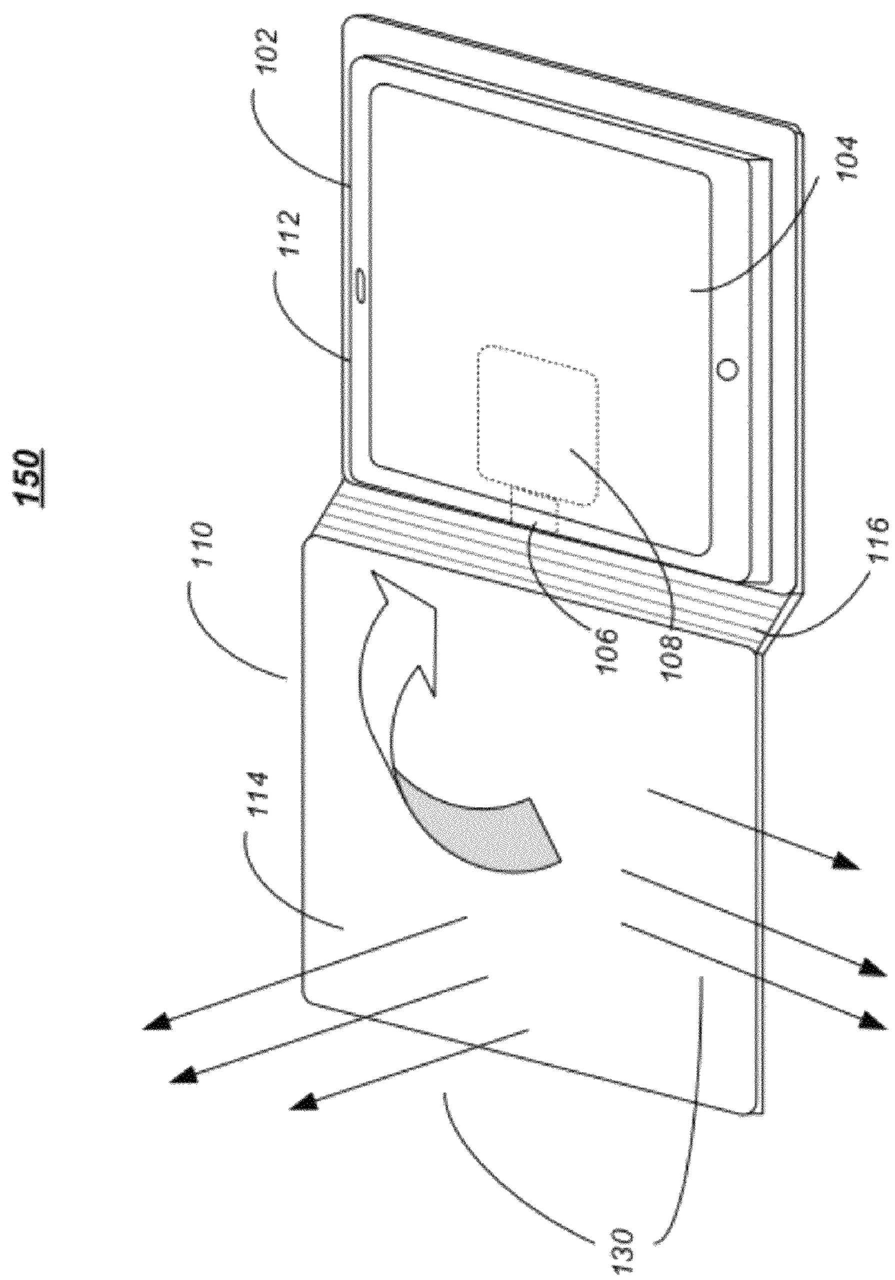
FIG. 1B illustrates one embodiment of a second system.
Figure 1C:
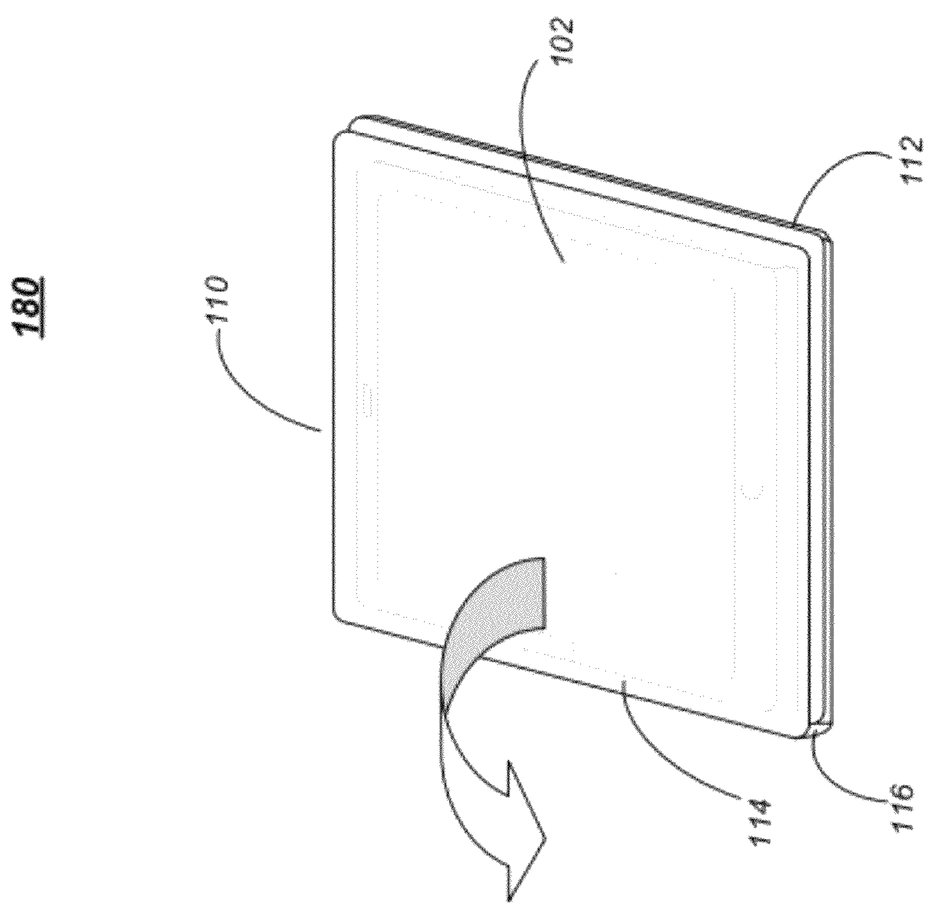
FIG. 1C illustrates one embodiment of a third system.

FIGS. 1A, 1B and 1C illustrate mobile computing device and case systems 100, 150 and 180. In various embodiments, the systems 100, 150 and 180 may comprise the same or similar system in different arrangements and configuration. For example, system 100 of FIG. 1A illustrates a separate case 110 and mobile computing device 102 in some embodiments. In various embodiments, system 150 of FIG. 1B illustrates a combined case 110 and mobile computing device 102 with the second portion 114 of case 110 in a first position. System 180 of FIG. 1C illustrates a combined case 110 and mobile computing device 102 with the second portion 114 of case 110 in a second position. The embodiments are not limited to the arrangements or configurations shown in FIGS. 1A, 1B and 1C. A limited number and type of arrangements and configurations are provided for purposes of illustration and not limitation.

In various embodiments, as illustrated by the arrow in FIG. 1A, first portion 112 of case 110 may be arranged to receive the mobile computing device 102. For example, case 110 may be sized to accommodate and protect mobile computing device 102. As shown in FIG. 1B, thermally conductive coupling 106 of mobile computing device 102 and thermally conductive coupling 118 of case 110 may be arranged to removably couple the case 110 to one or more internal heat generating components 108 of the mobile computing device 102 in some embodiments. For example, the thermally conducting couplings 106, 118 may combine, mesh, integrate or otherwise come together to thermally couple the mobile computing device 102 and the case 110. In some embodiments, the thermally conductive couplings 106, 118 may also hold or secure the mobile computing device 102 within case 110. The embodiments are not limited in this context.

Case 110 may include a second portion 114 thermally coupled to the first portion 112 and the thermally conductive coupling 118 in some embodiments. In various embodiments, the second portion 114 may comprise or include one or more thermally conductive materials arranged to radiate thermal energy away from the one or more heat generating components 108. For example, the thermally conductive couplings 106, 118 may be arranged to removably couple the case 110 to one or more heat generating components 108 that may comprise one or more of a heat spreader, processor or memory of the mobile computing device 102. In some embodiments, thermal energy or heat may be transferred from one or more of the heat spreader, processor or memory to the second portion 114 of the case. The second portion 114 of the case 110 may be arranged to dissipate the transferred heat, as illustrated by the arrows 130 of FIG. 1B.

In various embodiments, the second portion 114 of the case 110 may be arranged to rotate around the mobile computing device 102 and the first portion 112 of the case 110 as illustrated by the large arrow in FIG. 1B. In some embodiments, the second portion 114 may be arranged to substantially align with and conceal a first side of the mobile computing device 102 including the display 104 in a first position as illustrated in FIG. 1C. In a second position, as illustrated in FIG. 1B, the second portion 114 may be arranged to reveal the first side of the mobile computing device 102 and the display 104. Particular arrangements, positions and configurations are shown and described for purposes of illustration and not limitation.

In various embodiments, the first portion 112 may comprise a base portion of the case 110 and the second portion 114 comprises a cover or lid portion of the case 110. For example, the mobile computing device 102 may include a front side (e.g. the side including display 104) and a back side (e.g. a side opposite the front side), wherein the back side of the mobile computing device 102 is arranged to contact the base portion 112 of the case 110. In some embodiments, the cover portion 114 of the case 110 may arranged to contact the front side of the mobile computing device 102 including the digital display 104 in a first closed position (e.g. as illustrated in FIG. 1C) to conceal the digital display 104 and to reveal the digital display 104 in a second open position (e.g. as illustrated in FIG. 1B). Other embodiments are described and claimed.

Figure 2:
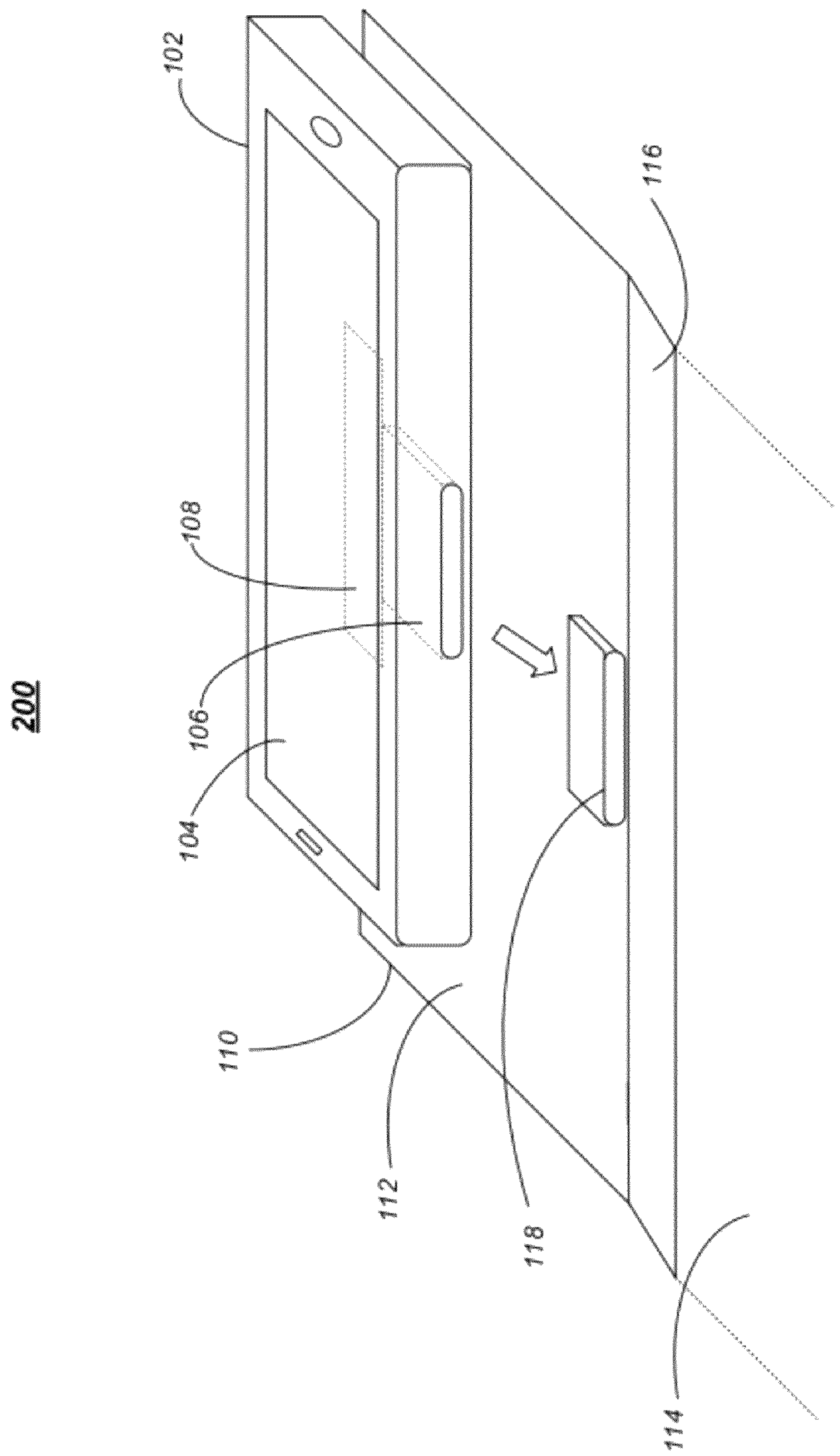
FIG. 2 illustrates one embodiment of a fourth system.

FIG. 2 illustrates a mobile computing device and case system 200 in some embodiments. In various embodiments, system 200 may the same or similar to systems 100, 150 and 180 of FIGS. 1A, 1B and 1C. Like components are similarly numbered throughout. In various embodiments, system 200 illustrates the combination or thermal coupling of mobile computing device 102 and case 110. As shown in FIG. 2, thermally conductive coupling 106 of mobile computing device 100 may comprise an opening in a side of the enclosure of the mobile computing device. The thermally conductive coupling 106 may be arranged to receive a matching or mated thermally conductive coupling 118 from case 110. In this manner, in some embodiments, the combined thermally conductive couplings 106, 118 may allow for the transfer of heat or thermal energy from the one or more heat generating components 108 to the thermally conductive case 110.

In various embodiments, thermally conductive case 110 may be arranged to dissipate heat in a plurality of positions or arrangements. For example, case 110 may be arranged to dissipate heat 130 in an open position as shown in FIG. 1B. In various embodiments, heat generated by the components 108 may pass through thermally conductive couplings 106, 118 to be dissipated by case 110. In some embodiments, the heat or thermal energy may be first passed to the first portion 112, hinge 116 or directly to second portion 114. In a preferred embodiment, both hinge 116 and second portion 114 may be arranged to dissipate the thermal energy 130 in an open position as shown in FIG. 1B. In this configuration, both side of second portion 114 may be exposed to air to allow for a maximum amount of surface area for cooling. In other embodiments, the first portion 112 also be arranged to dissipate heat generated by the one or more heat generating components 108. The case 110 may also be arranged to dissipate heat in both the open (e.g. FIG. 1B) and closed (e.g. FIG. 1C) positions. The embodiments are not limited in this context.

While various embodiments describe a mobile computing device being thermally coupled to a case to increase thermal radiation, the embodiments are not limited in this context. For example, in some embodiments, the enclosure of the mobile computing device may be thermally coupled to the one or more heat generating components and may also be in direct contact with the thermally conductive case. In this way, a specific thermal coupling may not be necessary and heat generated by the one or more heat generating components may be radiated through the enclosure of the mobile computing device to the thermally conductive case for dissipation. In this example, the enclosure of the mobile computing device and the case may comprise or include thermally conductive material. Other embodiments are described and claimed.

Figure 3:
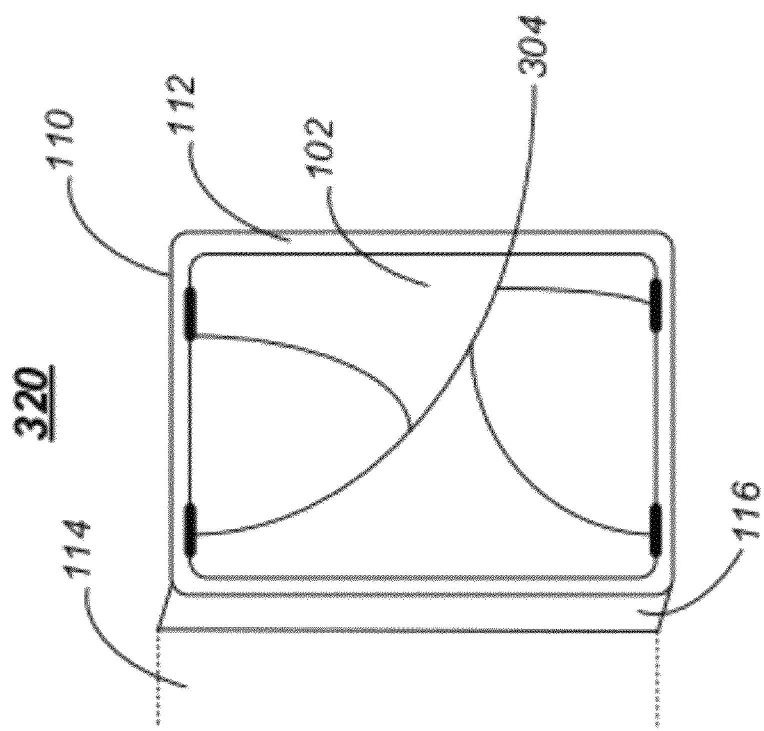
FIG. 3 illustrates one embodiment of a fifth system.
Figure 3:
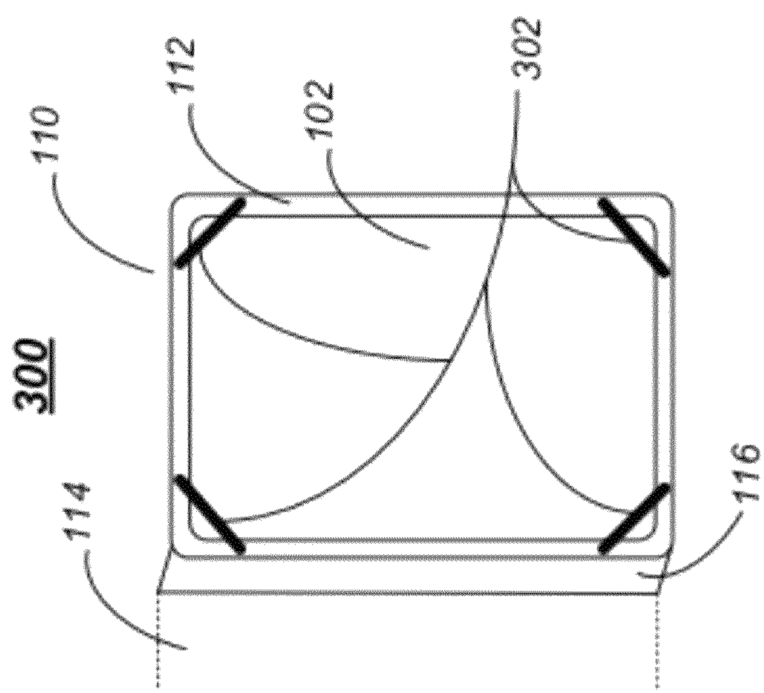

FIG. 3 illustrates mobile computing device and case systems 300 and 320. These systems may include the same or similar components to those described above in FIGS. 1A, 1B, 1C and 2. The systems 300 and 320 of FIG. 3 may illustrate, in some embodiments, the mobile computing device 102 being secured to the base portion 112 of the case 110 using one or more clamps, straps or clips 302, 304. In various embodiments, first portion 112 may be arranged to removably secure the mobile computing device 102 to the case 110. For example, elastic or other straps 302 may be used to secure mobile computing device 102 to case 110 in some embodiments. In other embodiments, clips 304 may be integrated into of case 110 and enclosure 105 of mobile computing device 102 may be arranged to receive the clips 304 and secure mobile computing device 102 to case 110. A limited number, type and arrangement of securing mechanisms are illustrated and described herein for purposes of illustration and not limitation, as one of ordinary skill in the art will understand.

Figure 4:
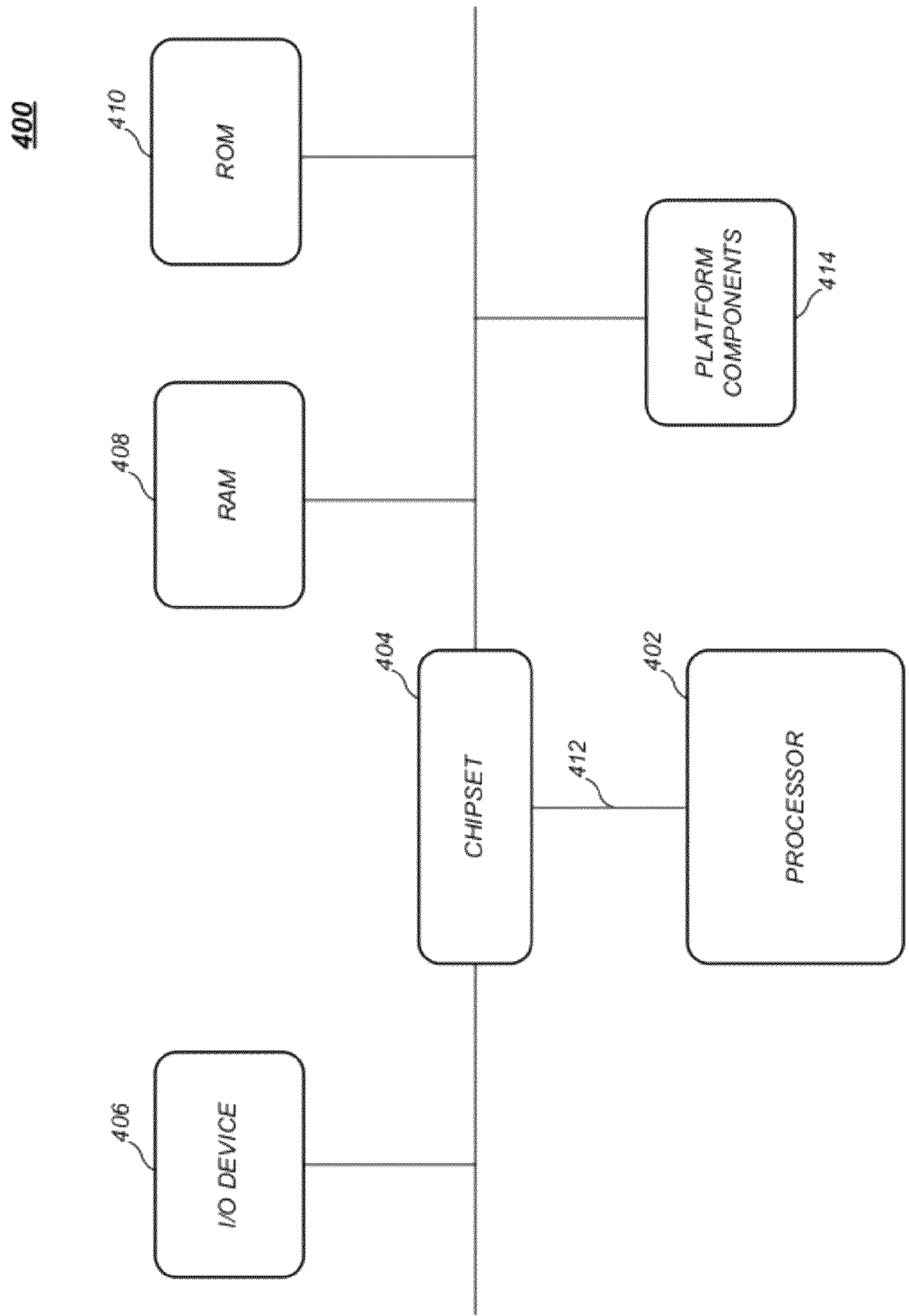
FIG. 4 illustrates one embodiment of a sixth system.

FIG. 4 is a diagram of an exemplary system embodiment. In particular, FIG. 4 is a diagram showing a system 400, which may include various elements. For instance, FIG. 4 shows that system 400 may include a processor 402, a chipset 404, an input/output (I/O) device 406, a random access memory (RAM) (such as dynamic RAM (DRAM)) 408, and a read only memory (ROM) 410, and various platform components 414 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

As shown in FIG. 4, I/O device 406, RAM 408, and ROM 410 are coupled to processor 402 by way of chipset 404. Chipset 404 may be coupled to processor 402 by a bus 412. Accordingly, bus 412 may include multiple lines.

Processor 402 may be a central processing unit comprising one or more processor cores and may include any number of processors having any number of processor cores. The processor 402 may include any type of processing unit, such as, for example, CPU, multi-processing unit, a reduced instruction set computer (RISC), a processor that have a pipeline, a complex instruction set computer (CISC), digital signal processor (DSP), and so forth.

Although not shown, the system 400 may include various interface circuits, such as an Ethernet interface and/or a Universal Serial Bus (USB) interface, and/or the like. In some exemplary embodiments, the I/O device 406 may comprise one or more input devices connected to interface circuits for entering data and commands into the system 400. For example, the input devices may include a keyboard (physical or virtual/soft), mouse, touch screen, track pad, track ball, isopoint, a voice recognition system, and/or the like. Similarly, the I/O device 406 may comprise one or more output devices connected to the interface circuits for outputting information to an operator. For example, the output devices may include one or more displays, printers, speakers, and/or other output devices, if desired. For example, one of the output devices may be a display. The display may be a cathode ray tube (CRTs), liquid crystal displays (LCDs), or any other type of display.

The system 400 may also have a wired or wireless network interface to exchange data with other devices via a connection to a network. The network connection may be any type of network connection, such as an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A case for a mobile computing device, comprising:

a first portion arranged to receive the mobile computing device;

a thermally conductive coupling arranged to removably couple the case to one or more internal heat generating components of the mobile computing device; and a second portion thermally coupled to the first portion and the thermally conductive coupling, the second portion comprising one or more thermally conductive materials arranged to radiate thermal energy away from the one or more heat generating components.

2. The case of claim 1, comprising:

a thermally conductive hinge arranged to couple the first portion and the second portion, wherein the thermally conductive hinge comprises a flexible conductive material.

3. The case of claim 2, wherein the thermally conductive hinge comprises one or more of plastic, rubber or leather arranged around a flexible conductive material.

4. The case of claim 1, wherein the thermally conductive coupling is arranged to removably couple the case to one or more of a heat spreader, processor or memory of the mobile computing device and to transfer thermal energy from one or more of the heat spreader, processor or memory to the second portion of the case.

5. The case of claim 1, wherein the second portion of the case is arranged to rotate around the mobile computing device and the first portion of the case and to substantially align with and conceal a first side of the mobile computing device including the display in a first position and to reveal the first side of the mobile computing device and the display in a second position.

6. The case of claim 1, wherein the first portion is arranged to dissipate heat generated by the one or more heat generating components.

7. The case of claim 1, wherein the mobile computing device comprises a tablet computing device having a digital touchscreen display.

8. The case of claim 1, wherein the first portion is arranged to removably secure the mobile computing device to the case.

9. A system, comprising:

a case removably coupled to a mobile computing device and one or more heat generating components of the mobile computing device, the case having a first portion arranged to receive and secure the mobile computing device, a second portion coupled to and arranged to dissipate heat from one or more of the heat generating components, and a thermally conductive hinge arranged to couple the first portion and the second portion.

10. The system of claim 9, wherein the mobile computing device comprises a tablet computing device having a digital display and the one or more heat generating components.

11. The system of claim 9, wherein the first portion comprises a base portion of the case and the second portion comprises a cover portion of the case.

12. The system of claim 11, wherein the mobile computing device comprises a front side and a back side, wherein the back side of the mobile computing device is arranged to contact the base portion of the case when the mobile computing device is secured to the base portion of the case using one or more clamps, straps or clips.

13. The system of claim 12, wherein the cover portion of the case is arranged to contact the front side of the mobile computing device including the digital display in a first closed position to conceal the digital display and to reveal the digital display in a second open position.

14. The system of claim 9, wherein the first portion and the thermally conductive hinge are arranged to dissipate heat from the one or more heat generating components.

15. A tablet computing device, comprising:

a digital display;

one or more heat generating components; and a thermally conductive case removably and thermally coupled to one or more of the heat generating components and arranged to dissipate heat from one or more of the heat generating components.

16. The tablet computing device of claim 15, wherein the digital display comprises a digital touchscreen display arranged to occupy a substantial portion of a first side of the tablet computing device.

17. The tablet computing device of claim 15, wherein a first portion of the thermally conductive case is arranged to conceal the digital display in a first closed position and to reveal the digital display in a second open position.

18. The tablet computing device of claim 17, wherein the first portion comprises one or more thermally conductive materials arranged to dissipate heat from one or more of the heat generating components.

19. The tablet computing device of claim 15, wherein the mobile computing device comprises an enclosure arranged around the one or more heat generating components, the enclosure having one or more openings arranged to receive a thermally conductive coupling of the case.

20. The table computing device of claim 19, wherein the thermally conductive coupling of the case is arranged to thermally couple one or more of the heat generating components and the thermally conductive case.

* * * * *

UNITED STATES PATENT AND TRADEMARK OFFICE

CERTIFICATE OF CORRECTION

PATENT NO. : 8,355,248 B2
APPLICATION NO. : 12/970859
DATED : January 15, 2013
INVENTOR(S) : Yoshifumi Nishi It is certified that error appears in the above-identified patent and that said Letters Patent is hereby corrected as shown below:

In column 12, line 45, in claim 20, delete "table" and insert -- tablet --, therefor.

Signed and Sealed this
Twenty-sixth Day of February, 2013

Teresa Stanek Rea
*Acting Director of the United States Patent and Trademark Office*